US010686737B2

(12) United States Patent
Shimizu

(10) Patent No.: US 10,686,737 B2
(45) Date of Patent: Jun. 16, 2020

(54) INFORMATION PROCESSING APPARATUS AND PROGRAM

(71) Applicant: Konica Minolta, Inc., Tokyo (JP)

(72) Inventor: Hideaki Shimizu, Hino (JP)

(73) Assignee: Konica Minolta, Inc., Tokyo (JP)

( * ) Notice: Subject to any disclaimer, the term of this patent is extended or adjusted under 35 U.S.C. 154(b) by 142 days.

(21) Appl. No.: 15/945,440

(22) Filed: Apr. 4, 2018

(65) Prior Publication Data

US 2018/0295073 A1 Oct. 11, 2018

(30) Foreign Application Priority Data

Apr. 5, 2017 (JP) ................. 2017-074918

(51) Int. Cl.
*H04L 12/58* (2006.01)
*G06F 3/0481* (2013.01)
*G06Q 10/10* (2012.01)

(52) U.S. Cl.
CPC .......... *H04L 51/04* (2013.01); *G06F 3/04817* (2013.01); *G06Q 10/107* (2013.01); *H04L 51/08* (2013.01); *H04L 51/34* (2013.01)

(58) Field of Classification Search
CPC .......... G06Q 10/107; G06Q 10/06311; G06Q 10/10; H04L 51/24; H04L 51/04; H04L 12/58; H04W 4/12; G06F 3/0481
See application file for complete search history.

(56) References Cited

U.S. PATENT DOCUMENTS

| 2008/0120386 | A1* | 5/2008 | Piccinini | G06Q 10/107 709/206 |
| 2008/0177850 | A1* | 7/2008 | Piccinini | G06Q 10/107 709/206 |
| 2010/0306322 | A1* | 12/2010 | Conahan | G06Q 10/107 709/206 |
| 2013/0007168 | A1* | 1/2013 | Hashimoto | H04L 51/02 709/206 |
| 2013/0339276 | A1* | 12/2013 | Lai | G06Q 10/107 706/12 |
| 2014/0089235 | A1* | 3/2014 | Lynar | H04L 51/02 706/12 |
| 2014/0164525 | A1* | 6/2014 | Malik | H04L 51/32 709/206 |
| 2016/0011757 | A1* | 1/2016 | Hoffman | G06Q 10/10 715/752 |
| 2017/0039208 | A1* | 2/2017 | Nelson | G06Q 30/01 |

(Continued)

FOREIGN PATENT DOCUMENTS

JP H07-175792 A 7/1995
JP 2010-073145 A 4/2010

*Primary Examiner* — Sargon N Nano
(74) *Attorney, Agent, or Firm* — Osha Liang LLP

(57) ABSTRACT

An information processing apparatus includes a central processing unit (CPU) that: transmits and receives a message via a network; manages the message received; discriminates reply necessity to the message being managed; discriminates a message type according to a content of the message discriminated as a message that requires a reply; and calculates an estimated time required by a recipient of the message to reply to the message according to the message type discriminated. The information processing apparatus further includes a user interface that displays the estimated time before displaying the message.

21 Claims, 16 Drawing Sheets

(56) References Cited

U.S. PATENT DOCUMENTS

| | | | | |
|---|---|---|---|---|
| 2017/0161720 A1* | 6/2017 | Xing | ............... | G06Q 20/3278 |
| 2017/0289086 A1* | 10/2017 | Grotto | ............... | H04L 51/16 |
| 2017/0289093 A1* | 10/2017 | Snider | ............... | H04L 51/34 |
| 2018/0350180 A1* | 12/2018 | Onischuk | ............... | G07C 13/00 |

* cited by examiner

| MESSAGE TYPE | ESTIMATED TIME REQUIRED FOR REPLY |
|---|---|
| GENERAL MESSAGE | 20 MINUTES |
| YesNo QUESTION | 5 MINUTES |

| Index | TRANSMISSION DATE AND TIME | ACTUAL TIME FOR REPLY |
|---|---|---|
| 1 | 2015/5/14 15:32 | 53s |
| 2 | 2015/6/4 10:24 | 49s |
| 3 | 2015/6/13 12:32 | 63s |

| Index | TRANSMISSION DATE AND TIME | ACTUAL TIME FOR REPLY |
|---|---|---|
| 1 | 2015/6/2 12:21 | 432s |
| 2 | 2015/6/5 18:03 | 512s |
| 3 | 2015/6/14 10:21 | 414s |
| 4 | 2015/6/15 13:15 | 685s |

T4

| DESTINATION | YesNo QUESTION | GENERAL MESSAGE |
|---|---|---|
| YAMADA (yamada@abc.com) | 55s | 642s |
| SATO (sato@abc.com) | 47s | 520s |
| SUZUKI (suzuki@abc.com) | 104s | 842s |

| No. | ACTUAL TIME FOR REPLY (SECOND) | NUMBER OF CHARACTERS | TIME REQUIRED PER CHARACTER (SECOND/CHARACTER) |
|---|---|---|---|
| 1 | 42s | 123 CHARACTERS | 0.41 |
| 2 | 1536s | 1434 CHARACTERS | 1.07 |
| 3 | 2054s | 1293 CHARACTERS | 1.59 |
| 4 | 203 | 243 CHARACTERS | 0.84 |
| 5 | 421 | 432 CHARACTERS | 0.97 |
|  |  | AVERAGE | 0.98 (SECOND/CHARACTER) |

INFORMATION PROCESSING APPARATUS AND PROGRAM

CROSS-REFERENCE TO RELATED APPLICATIONS

The entire disclosure of Japanese patent Application No. 2017-074918, filed on Apr. 5, 2017, is incorporated herein by reference in its entirety.

BACKGROUND

Technical Field

The present invention relates to an information processing apparatus and a program.

Description of the Related Art

Typically, when a user who has arrived at the office starts a personal computer (PC) terminal, a mail client installed in the PC terminal starts receiving mails accumulated in a mail server. The mails to be received include mails that require a reply, advertising mails, and the like. The mail client has a sort function to sort and display the mails according to a specific item on a mail list screen, and can display unread mails at the top and can display only the unread mails.

However, in a case where the mail client has received many mails at once, there are also many unread mails. Only subjects, names of senders, and reception dates and times of the unread mails are displayed on the mail list screen. The user can know which mail needs a reply and can estimate how long creation of a reply takes time only after opening an unread mail and confirming a message body. Furthermore, since only minimum information of the message body is shown in the subject of the mail, the user can judge which mail should be read first and which mail should be replied only after opening the mail and reading the message body.

JP 2010-73145 A discloses a technology to generate a notification notifying that a mail that requires a reply has been received or a notification notifying that a normal mail that is an electronic mail other than the mail that requires a reply has been received, and display the notification in a selective manner on display means.

JP 7-175792 A discloses a technology to predict a document creation time on the basis of input personal identification information and document component identification information, and a stored document creation time of each person, and displays the document creation time.

However, even if the technology disclosed in JP 2010-73145 A is used, the user cannot judge how long the reply to the received mail takes time and which mail should be read first, and the technology cannot be of help for setting a schedule at the reception date.

Further, when the technology disclosed in JP 7-175792 A is used, the component of the document needs to be set in advance in creating the document. Further, in a case where the user knows creation of the document does not take time, the user himself/herself can estimate the creation time of the mail without setting the component of the document and displaying an estimated time. Furthermore, in the technology disclosed in JP 7-175792 A, the predicted document creation time is displayed when starting creation of the document. Therefore, the user cannot estimate the creation time of the document before creating the document and cannot judge the creation order of document.

SUMMARY

The present invention has been made in view of the foregoing, and enables a user to promptly grasp a necessary time for a reply.

According to one or more embodiments of the present invention, an information processing apparatus comprises: a communicator that transmits and receives a message via a network; a mail manager that manages the message received by the communicator; a reply necessity discriminator that discriminates reply necessity to the message managed by the mail manager; a message type discriminator that discriminates a message type indicating a type of the message according to content of the message discriminated as a message that requires a reply; a time required for reply calculator that calculates an estimated time required for reply required by a recipient of the message to perform a reply to the message according to the message type discriminated by the message type discriminator; and a user interface that displays the estimated time required for reply before displaying the message.

BRIEF DESCRIPTION OF THE DRAWINGS

The advantages and features other than those described above will become more fully understood from the detailed description given hereinbelow and the appended drawings which are given by way of illustration only, and thus are not intended as a definition of the limits of the present invention:

FIG. 9 is an explanatory diagram illustrating a configuration example of a history table of YesNo question type according to one or more embodiments of the present invention;

FIG. 10 is an explanatory diagram illustrating a configuration example of a history table of general message type according to one or more embodiments of the present invention;

FIG. 21 is an explanatory diagram illustrating a configuration example of a time required for reply table according to a modification of one or more embodiments of the present invention.

DETAILED DESCRIPTION OF EMBODIMENTS

Figure 1:
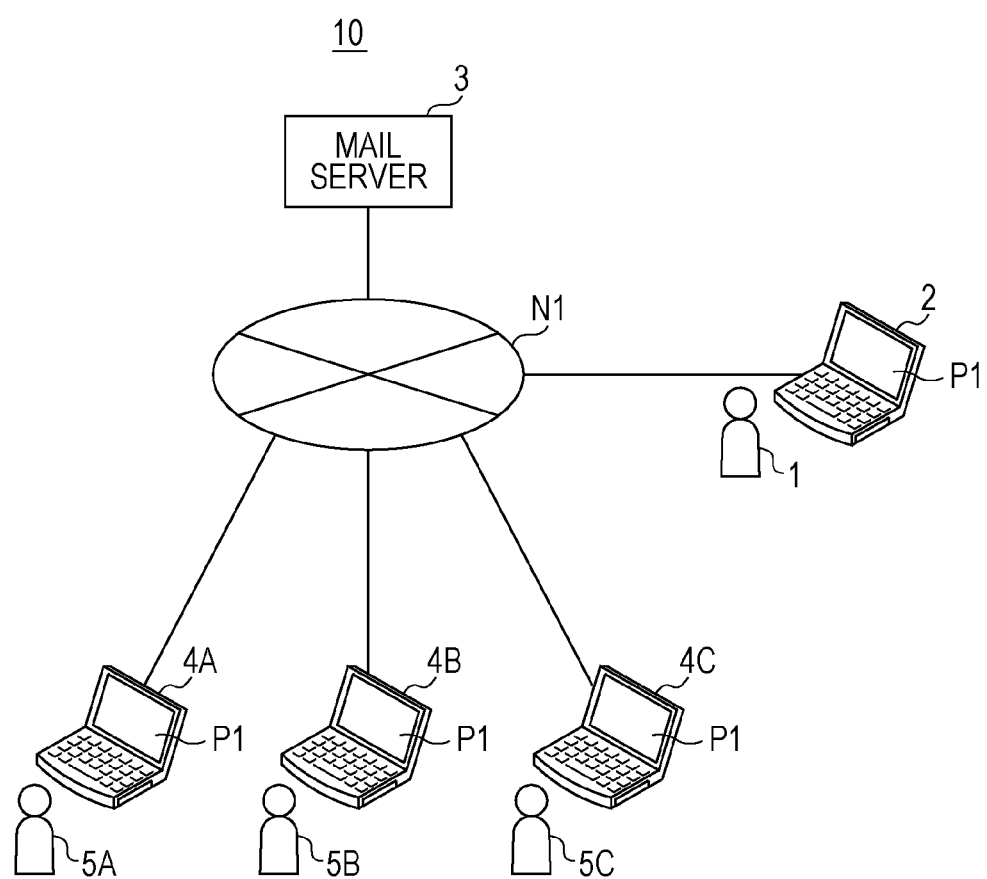
FIG. 1 is an overall configuration diagram illustrating an outline of a message transmission and reception system according to one or more embodiments of the present invention.

Hereinafter, embodiments of the present invention will be described with reference to the drawings. However, the scope of the invention is not limited to the disclosed embodiments. In the present specification and drawings, redundant description is omitted for configuration elements having substantially the same function or configuration by denoting the same reference numeral.

First, a configuration example and an operation example of a message transmission and reception system according to one or more embodiments of the present invention will be described.

FIG. 1 is an overall configuration diagram illustrating an outline of a message transmission and reception system 10.

The message transmission and reception system 10 includes a PC terminal 2 (an example of an information processing apparatus), a mail server 3, and PC terminals 4A to 4C (examples of the information processing apparatus). The PC terminals 2, and 4A to 4C and the mail server 3 are connected to one another through a network N1. The network N1 is an open network such as the Internet. However, the network N1 may be a closed network such as an in-house LAN.

The message transmission and reception system 10 manages transmission and reception of messages exchanged between the PC terminal 2 and the PC terminals 4A to 4C. In one or more embodiments of the present invention, as an example of a message, a case of transmitting and receiving an e-mail (abbreviated as "mail") will be described. The mail is mainly composed of a mail address of a user who is a sender of the mail, a mail address of a user who is a destination of the mail, a subject, and a message body, and a message as the content of the mail is described in the message body. In addition, files may be attached to the mail.

Figure 2:
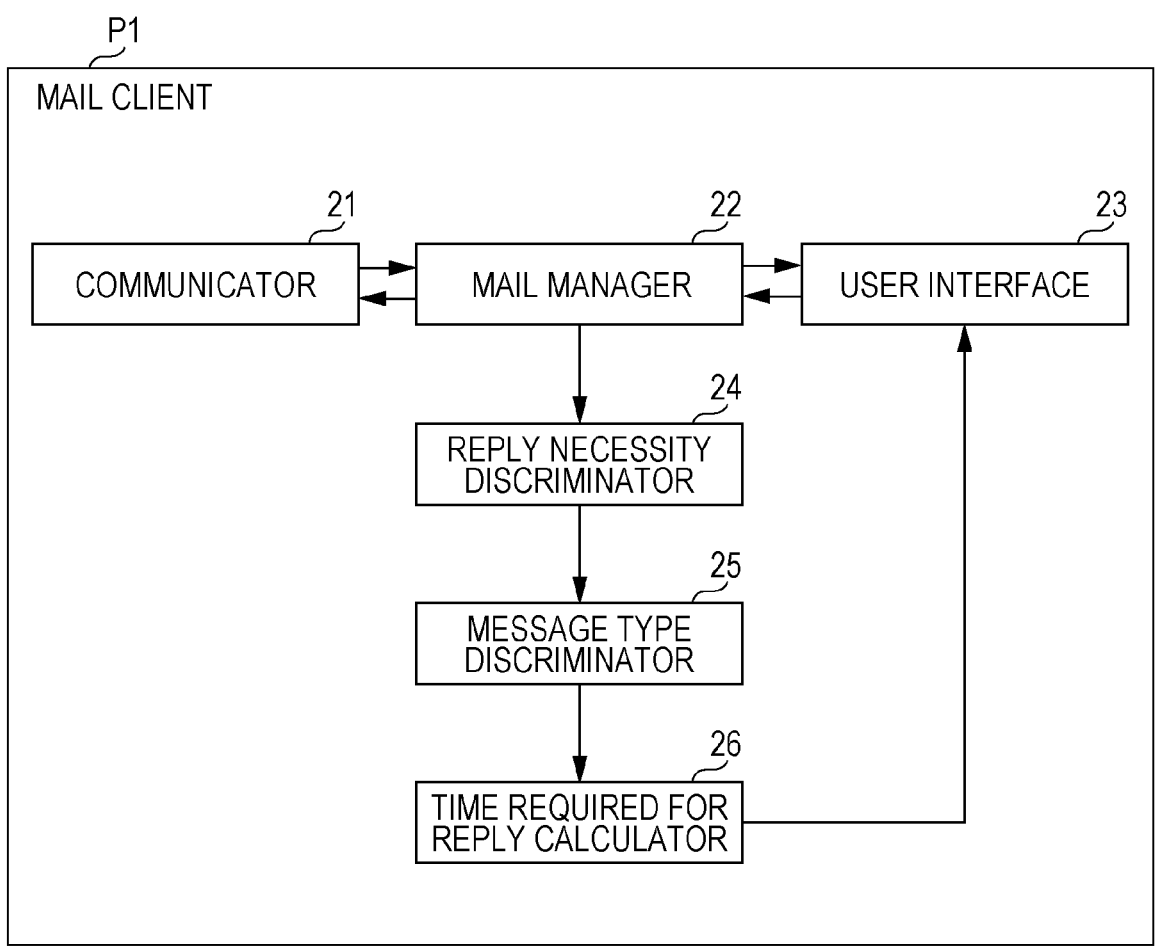
FIG. 2 is a block diagram illustrating an internal configuration example of a mail client according to one or more embodiments of the present invention.

A user 1 operates the PC terminal 2 and creates a mail using a mail client P1 (an example of a mail creation program) as illustrated in FIG. 2 to be described below. The mail client P1 receives mails transmitted from users 5A to 5C, and transmits the mail created by the user 1. The mail transmitted from the mail client P1 also includes a mail sent back by the user 1. The mail client P1 according to one or more embodiments of the present invention can present time required for replying to the mail to the user 1 who is a recipient of the mail. Reply of a mail includes an operation to select either Yes or No in addition to an operation to create the mail by the user 1 to the received mail. These operations are collectively referred to as "action".

The mail server 3 is used as an example of a mail management server that manages mails transmitted and received between the PC terminal 2 and the PC terminals 4A to 4C. A mail box is provided in the mail server 3, and the mails transmitted from the users 5A to 5C can be saved in the mail box. For example, in the case where the network N1 is an in-house LAN, the mail server 3 is one server shared by the PC terminal 2 and the PC terminals 4A to 4C. In the case where the network N1 is the Internet, the mail server 3 is a plurality of servers used for each of the PC terminal 2 and the PC terminals 4A to 4C.

The PC terminals 4A to 4C are used by the users 5A to 5C, respectively. The users 5A to 5C transmit a mail requesting a reply to the user 1 and receive a mail transmitted from the user 1, using the mail clients P1 installed in the PC terminals 4A to 4C, respectively.

FIG. 2 is a block diagram illustrating an internal configuration example of the mail client P1.

The mail client P1 is operated on the PC terminals 2, and 4A to 4C. The mail client P1 includes a communicator 21, a mail manager 22, a user interface 23, a reply necessity discriminator 24, a message type discriminator 25, and a time required for reply calculator 26.

The communicator 21 passes the mail received from the mail server 3 via the network N1 to the mail manager 22, and transmits a mail addressed to another user (for example, one of the users 5A to 5C) via the network N1 according to an instruction of the mail manager 22. The mail transmitted from the communicator 21 to the network N1 is accumulated in the mail server 3 and after transferred to the mail server 3 accessible by the another user according to header information added to the mail and the like, the mail becomes receivable by the another user.

The mail manager 22 saves and manages the mail received by the communicator 21. The mail received by the communicator 21 is a mail transmitted by the sender (for example, one of the users 5A to 5C) to the recipient (for example, the user 1). Further, the mail manager 22 also saves and manages the mail created by the recipient. Then, the mail manager 22 adds information indicating that a reply has been made, to a reply mail sent back by the recipient to the sender, and manages the reply mail. Further, the mail manager 22 manages whether the mail is read or unread.

Figure 5:
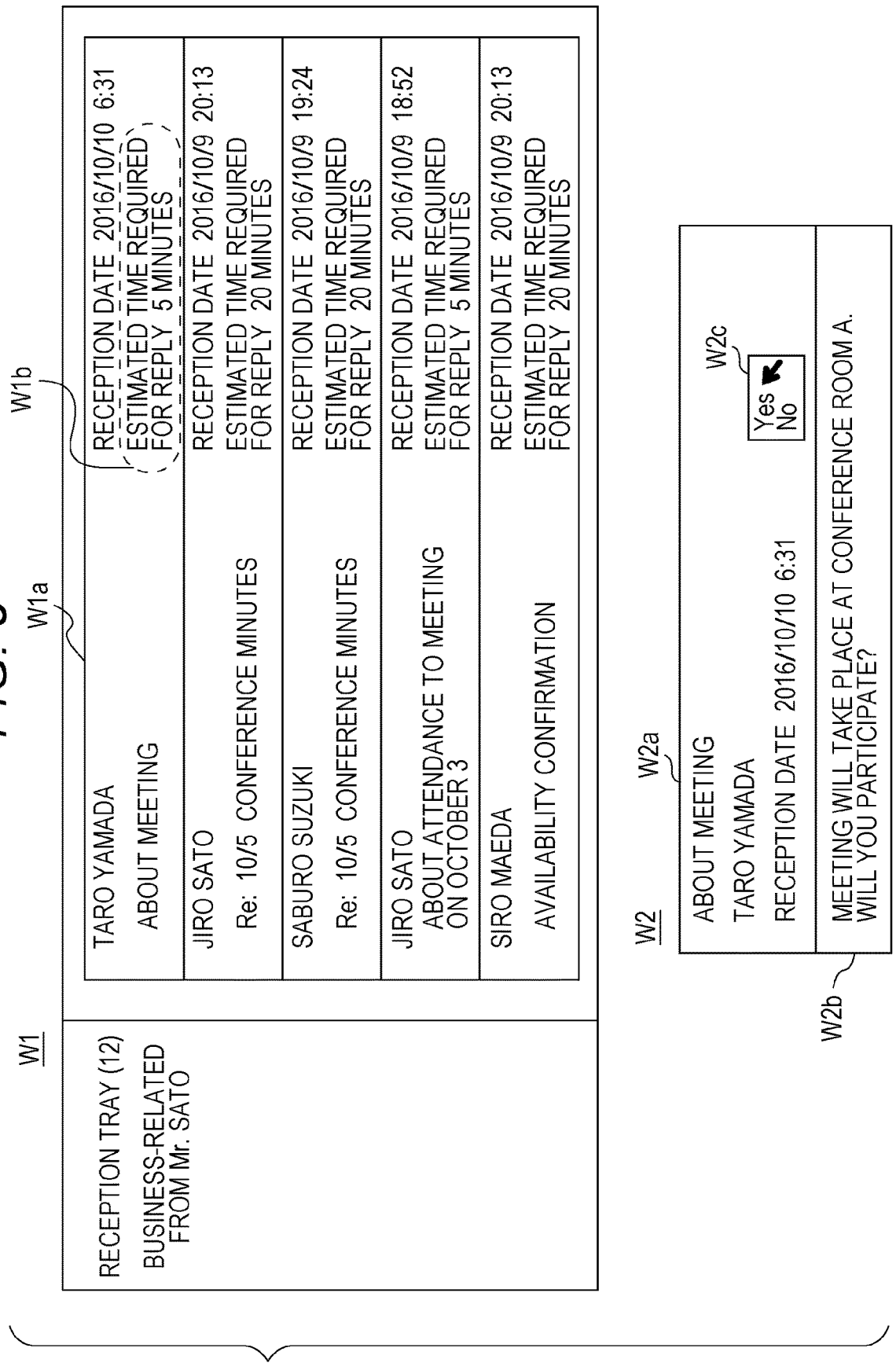
FIG. 5 is an explanatory diagram illustrating display examples of a received mail list screen and an individual mail confirmation screen according to one or more embodiments of the present invention.

The user interface 23 displays a predetermined screen to the recipient and receives an input from the user. The recipient can create a reply mail or a new mail through the user interface 23 and can transmit the created mail to a transmission destination. The user interface 23 displays mail information related to the mail managed by the mail manager 22 before the user opens the mail to display the message body. The mail information includes, for example, the name of the sender of the mail, the reception date of the mail, the subject of the mail, and the estimated time required for reply for creating a reply mail. The recipient can check the mail information and the message body through the user interface 23. Then the estimated time required for reply as illustrated in FIG. 5 described below is displayed on the screen displayed on the user interface 23.

The reply necessity discriminator 24 discriminates reply necessity to the mail managed by the mail manager 22. For example, the reply necessity discriminator 24 discriminates a mail sent by multicast transmission as a mail that requires a reply when destinations of the mail include the recipient, and discriminates the mail as a mail that does not require a reply when the destinations of the mail do not include the recipient. Further, the reply necessity discriminator 24 discriminates the mail to which no reply has been made by the recipient as the mail that requires a reply, and discriminates the mail to which a reply has been made as the mail that does not require a reply. Note that, when the received mail is an advertising mail, when the recipient is included in carbon copy (CC) or in blind carbon copy (BCC) and the recipient is simply asked to confirm the message body (for example, a reminder mail), or when no reply necessary is written in the subject or in the message body, the reply necessity discriminator 24 discriminates the mail as the mail that does not require a reply. However, even if the recipient is included in CC, the reply necessity discriminator 24 may discriminates the mail as the mail that requires a reply according to the content of the message body.

Figures 18, 19:
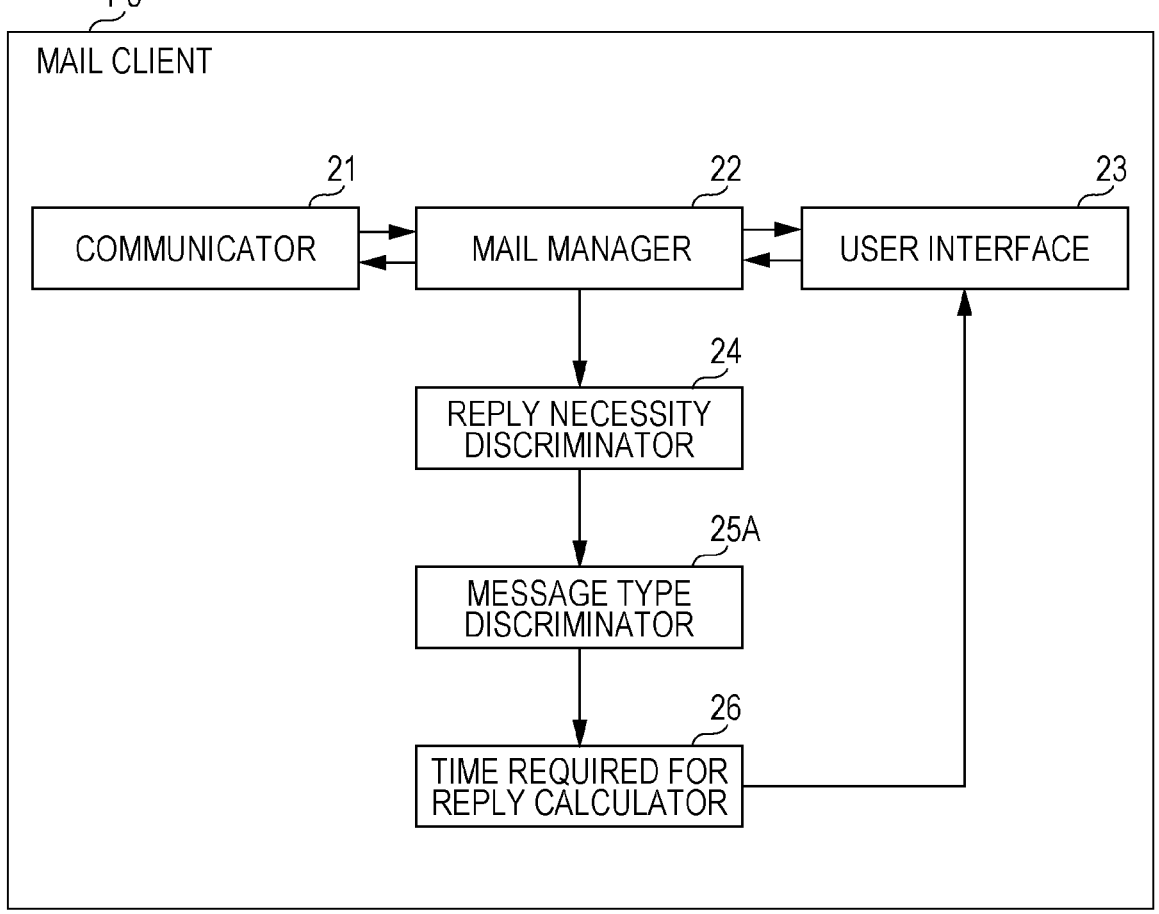
FIG. 18 is a block diagram illustrating an internal configuration example of a mail client according to one or more embodiments of the present invention.
FIG. 19 is an explanatory diagram illustrating a configuration example of a message type discrimination table of according to one or more embodiments of the present invention.

Further, the reply necessity discriminator 24 discriminates the mail as the mail that requires a reply when the mail is unread or when the mail is already read but no reply has been made in the past to the mail, and discriminates the mail as the mail that does not require a reply when a reply has been made to the mail in the past, on the basis of read or unread information of the mail managed by the mail manager 22. However, even if a reply has not been made to the mail, the sender may no longer desire a reply to the mail, which had been received prior to a predetermined period (for example, one week) from when the mail client P1 has been activated. Therefore, the reply necessity discriminator 24 may discriminate the mail for which no reply has been made prior to a predetermined period as the mail that does not require a reply. Further, the reply necessity discriminator 24 may discriminate the reply necessity on the basis of the content of a file attached to the mail. For example, when a phrase for requesting a reply as illustrated in FIG. 19 described below is described in the attached file, the reply necessity discriminator 24 can discriminate the mail as the mail that requires a reply.

Further, the reply necessity discriminator 24 may discriminate the mail as the mail that does not require a reply in a case where a reply has been made to the mail by the sender included in the multicast transmission destinations of the mail even if the destination of the mail sent by multicast transmission is the recipient. Sending replies having the same content from a plurality of users to one mail can be avoided.

The message type discriminator 25 discriminates a message type representing a type of the mail according to the content of the mail determined as the mail that requires a reply by the reply necessity discriminator 24. The message type is an index representing the type of a message, such as a YesNo question type or a general message type. The YesNo question type is an example of an answer request type with a short estimated time required for reply. Further, mails other than the answer request-type messages are general message-type messages. The answer request type includes any of giving two choices, attendance confirmation to an event, and an inquiry about a schedule.

The YesNo Question type is also a message type added to the mail. Therefore, the message type discriminator 25 can discriminate the type of the mail on the basis of the message type added to the mail. The message type discriminator 25 may discriminate the message type on the basis of the content of the mail when the mail is the general message-type mail or when the message type is not added to the mail.

Further, the message type discriminator 25 may discriminate the message type as the general message type when information indicating the degree of importance is added to the mail. Further, the message type discriminator 25 may classify the mail into a message type by different degrees of importance according to the degree of importance of the mail, other than the general message type. For example, in the case of a mail requesting the recipient to send an urgent reply, a reply deadline (for example, within one hour or by today) may be added to the mail as the information indicating the degree of importance. As for the mail to which the reply deadline is added, the reply deadline may be highlighted or the estimated time required for reply calculated only for the mail may be displayed by the user interface 23.

Note that information indicating the sender of the mail may be included in the message type. For example, in the case where a supervisor of user 1 is the user 5A, the user 1 needs to quickly reply to the mail transmitted from the user 5A. However, in the case where a friend of the user 1 is the user 5B, the user 1 may not need to rush to reply to the mail transmitted from the user 5B. Therefore, as the information indicating the sender of the mail, an attribute, a post, and the like of the sender with respect to the user 1 can be included. Then, the message type discriminator 25 can discriminate an appropriate message type on the basis of the information indicating the sender of the mail.

Figure 8:
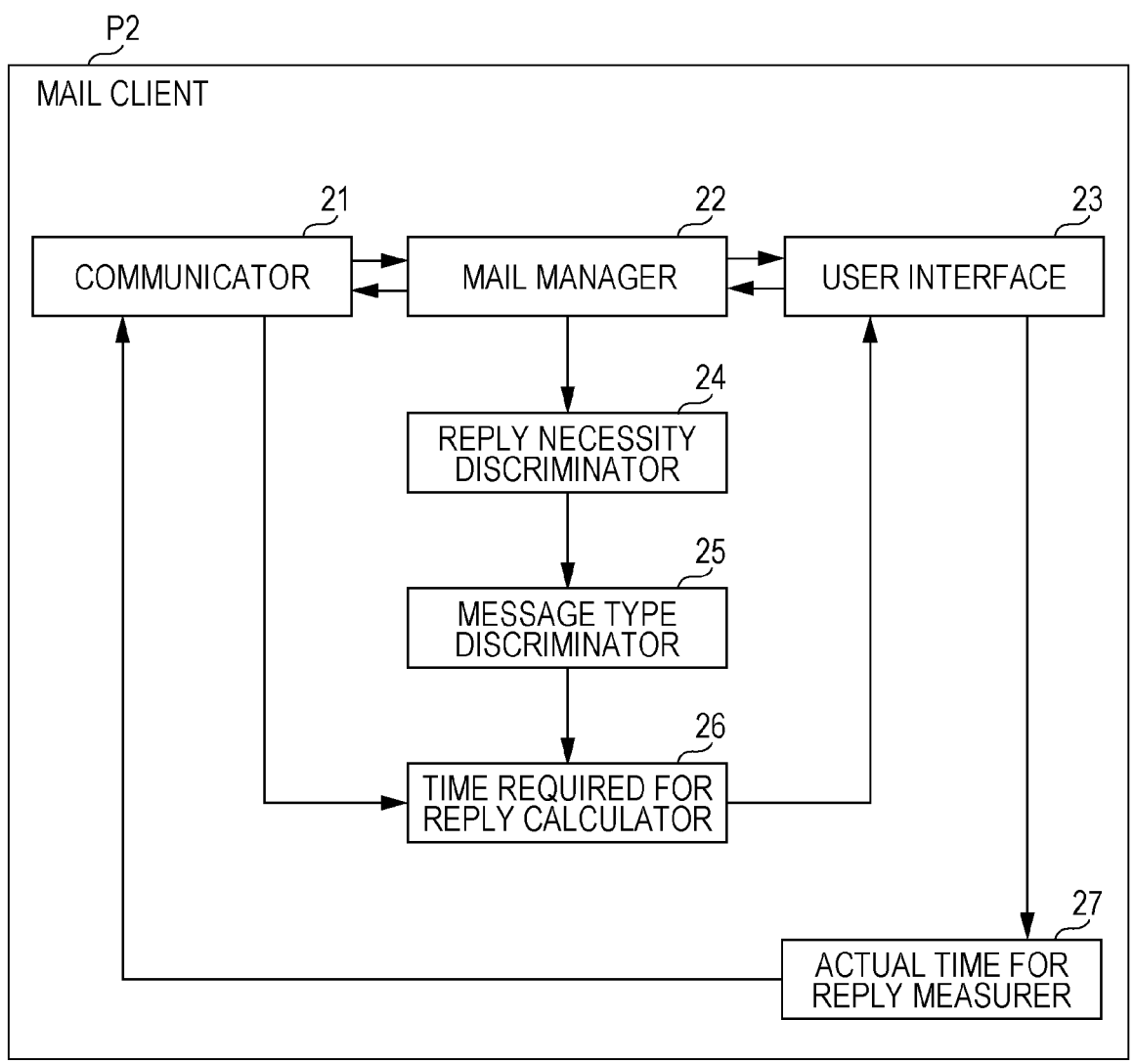
FIG. 8 is a block diagram illustrating an internal configuration example of a mail client according to one or more embodiments of the present invention.

The time required for reply calculator 26 calculates the estimated time required for reply to the mail by the recipient of the message according to the message type discriminated by the message type discriminator 25. In one or more embodiments of the present invention, the estimated time required for reply is calculated according to either the YesNo question type or the general message type of the message type. Note that the estimated time required for reply may be calculated according to the message type by different degrees of importance discriminated according to the degree of importance of the mail or the message type discriminated on the basis of the information indicating the sender of the mail, as described above. The time required for reply may be a time defined for each message type or may be a time calculated on the basis of an actual time required for a reply (called actual time for reply) by the recipient as illustrated in FIG. 8 described below. Then, the time required for reply calculator 26 outputs the calculated time required for reply to the user interface 23. Therefore, the time required for reply is displayed on the user interface 23.

Next, a hardware configuration of a calculator C constituting devices of the message transmission and reception system 10 will be described.

Figures 3, 4:
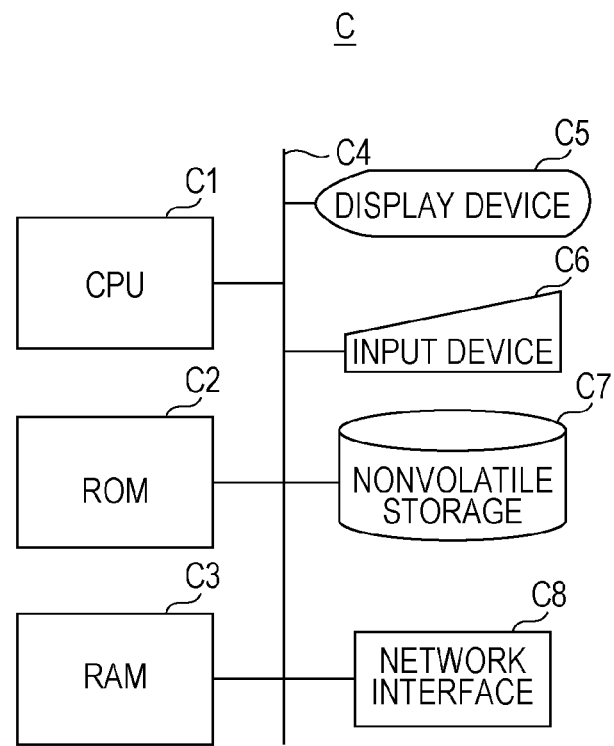
FIG. 3 is a block diagram illustrating a hardware configuration example of a calculator according to one or more embodiments of the present invention.
FIG. 4 is an explanatory diagram illustrating a configuration example of a time required table indicating a relationship between a message type and an estimated time required for reply according to one or more embodiments of the present invention.

FIG. 3 is a block diagram illustrating a hardware configuration example of the calculator C.

The calculator C is hardware used as a so-called computer. The calculator C includes a central processing unit (CPU) C1, a read only memory (ROM) C2, and a random access memory (RAM) C3 connected to a bus C4. Further, the calculator C includes a display device C5, an input device C6, a nonvolatile storage C7, and a network interface C8.

The CPU C1 reads a program code of software for realizing functions according to one or more embodiments of the present invention from the ROM C2 and executes the program code. In the RAM C3, variables, parameters, and the like generated during arithmetic processing are temporarily written. The display device C5 is, for example, a liquid crystal display monitor, and displays, to the recipient, results of processing performed in the calculator C, and the like. The input device C6 is, for example, a keyboard, a mouse, a touch panel, and the like, and the recipient can perform predetermined operation inputs and instructions. Note that the PC terminals 2 and 4 include the user interface 23 corresponding to the display device C5 and the input device C6, but the mail server 3 may not include the display device C5 and the input device C6.

As the nonvolatile storage C7, for example, a hard disk drive (HDD), a solid state drive (SSD), a flexible disk, an optical disk, a magneto optical disk, a CD-ROM, a CD-R, a magnetic tape, or a nonvolatile memory is used. In the nonvolatile storage C7, a program for causing the calculator C to function is recorded, in addition to an operating system (OS) and various parameters. The ROM C2 and the nonvolatile storage C7 record programs and data necessary for the CPU C1 to operate and are used as examples of a computer-readable non-transitory recording medium storing a program executed by the calculator C. Therefore, this program is permanently stored in the ROM C2 and the nonvolatile storage C7.

For example, a network interface card (NIC) or the like is used for the network interface C8, and various data can be transmitted and received among devices via a local area network (LAN), a special line, or the like.

FIG. 4 is an explanatory diagram illustrating a configuration example of a time required table T1 indicating a relationship between the message type and the estimated time required for reply.

The mail client P1 has a function to add the YesNo question type that enables the recipient to easily answer to the transmitted mail by two choices of Yes or No. The YesNo question-type mail is a mail transmitted with the intention to explicitly request a recipient's acceptance or refusal answer. In the case where the sender and recipient use the same type of mail client P1, the YesNo question-type mail can be used. Further, as described above, the mail to which no YesNo question type is added is discriminated as the general message-type mail by the message type discriminator 25.

Since the YesNo question type is added to the mail and transmitted, the message type of the mail to which the YesNo question type is added is the YesNo question type. The message type of the mail to which no YesNo question type is added is the general message type. In the case where the message type is the YesNo question type, an acceptance button and a refusal button selectable by the recipient are displayed on the mail client P1 of the recipient. The recipient can reply with acceptance or refusal to the sender of the YesNo question type by selecting and pressing either the acceptance button and the refusal button. The time required for the recipient to select and press either the acceptance button or the refusal button is extremely shorter than the time required to create a normal reply mail.

As illustrated in FIG. 4, the time required table T1 possessed by the message type discriminator 25 has fields of the message type and the estimated time required for reply. The time required table T1 shows that the estimated time required for reply to the general message type is 20 minutes and the estimated time required for reply to the YesNo question type is 5 minutes. In one or more embodiments of the present invention, the estimated time required for reply is saved as a prescribed value for each message type of the general message type and the YesNo question type. Note that the estimated time required for reply can be changed as appropriate by the recipient for each message type.

FIG. 5 is an explanatory diagram illustrating display examples of a received mail list screen W1 and an individual mail confirmation screen W2. A display example of the received mail list screen W1 is illustrated on the upper side in FIG. 5, and a display example of the individual mail confirmation screen W2 is illustrated on the lower side in FIG. 5. Each screen is displayed on the user interface 23.

As illustrated on the upper side in FIG. 5, the received mail list screen W1 for displaying a list of mail information of received mails is displayed. The received mail list screen W1 includes a plurality of mail information display fields W1a. In the mail information display field W1a, a reception date and an estimated time required for reply W1b of the mail are displayed in addition to the name of the sender of the mail and the subject of the mail included in the header information of the mail. The reception date of the mail is information managed by the mail manager 22. The estimated time required for reply W1b is information calculated by the time required for reply calculator 26.

As described above, the estimated time required for reply calculated by the time required for reply calculator 26 is displayed on the basis of the message type of the mail discriminated by the message type discriminator 25. For example, when the mail is discriminated as the YesNo question-type mail, the estimated time required for reply is displayed as "5 minutes" on the user interface 23. Meanwhile, when the mail is discriminated as the general message-type mail, the estimated time required for reply is displayed as "20 minutes" on the user interface 23. Since the estimated time required for reply W1b is displayed in the mail information display field W1a in this manner, the recipient of the mail can easily grasp the time required for reply to the mail without opening the mail and checking the message body.

Then, when any of the mail information display fields W1a on the received mail list screen W1 is selected, the individual mail confirmation screen W2 for individually displaying the message body of the received mail is displayed, as illustrated on the lower side in FIG. 5. On the individual mail confirmation screen W2, an individual mail information display field W2a for individually displaying the mail information and a message body display field W2b for displaying the message body are displayed.

For example, assuming that the mail information display field W1a displayed at the top on the received mail list screen W1 is selected. The YesNo question type is added to this mail as the message type. Therefore, a two-choice selection button W2c for prompting the recipient to select either "Yes" or "No" is displayed in the individual mail information display field W2a. The recipient can select "Yes" or "No" through the two-choice selection button W2c by operating the instruction icon indicated by the arrow. "Yes" or "No" selected by the recipient is added to the subject of the reply mail and sent back to the sender of the mail. Therefore, the recipient does not need the time for describing the message body of the mail, and the time required for reply can also be shortened. Further, the sender who has received the reply mail to which "Yes" or "No" is attached can know the result of the two choices from the recipient without opening the reply mail.

Note that the recipient may be able to write some comment in the message body of the reply mail with "Yes" or "No" added to the subject. In this case, information such as "a comment in the body" may be added to the subject of the reply mail so that the sender can confirm the comment.

Figure 6:
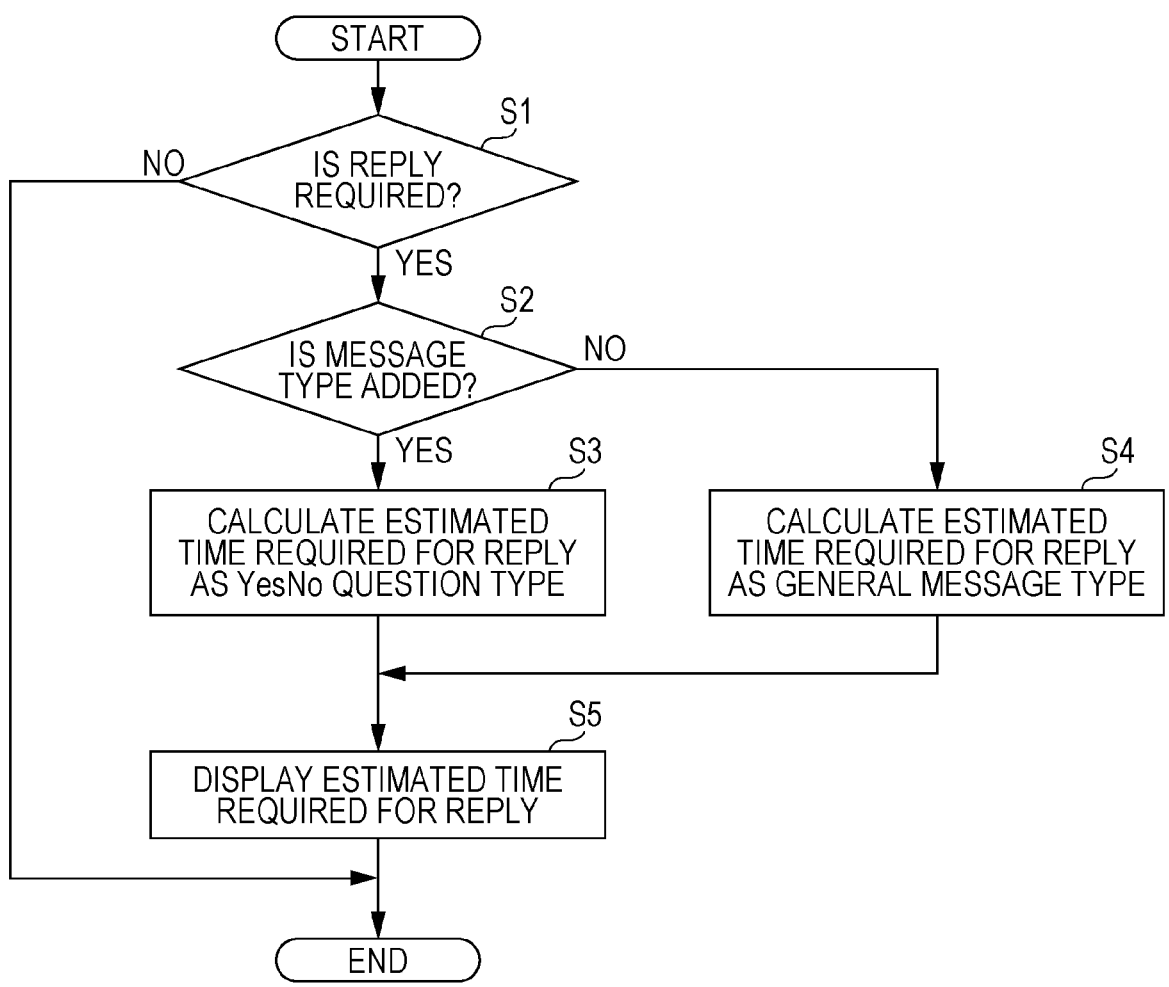
FIG. 6 is a flowchart illustrating an operation example of a mail client in a PC terminal according to one or more embodiments of the present invention.

FIG. 6 is a flowchart illustrating an operation example of the mail client P1 in the PC terminal 2.

First, after the communicator 21 receives the mail and the mail is saved in the mail manager 22, the reply necessity discriminator 24 discriminates the reply necessity of the mail (S1). In the case where a reply has already been sent to the mail or the recipient is included in CC or BCC of the mail, the reply necessity discriminator 24 discriminates the mail as the mail that does not require a reply (No in S1) and terminates the present processing. On the other hand, when the recipient is included in the destination or a reply is required from the content of the added file of the mail, the reply necessity discriminator 24 discriminates the mail as the mail that requires a reply (Yes in S1).

Next, the message type discriminator 25 discriminates whether the message type is added to the mail discriminated as the mail that requires a reply (S2). Here, whether the YesNo question type is added to the mail as the message type is discriminated.

When the message type is added to the mail (Yes in S2), the time required for reply calculator 26 calculates the estimated time required for reply in view of the mail as the YesNo question-type mail (S3). On the other hand, when the message type is not added to the mail (No in S2), the time required for reply calculator 26 calculates the estimated time required for reply in view of the mail as the general message-type mail (S4).

After step S3 or S4, the time required for reply calculator 26 outputs the calculated estimated time required for reply to the user interface 23. Then, the user interface 23 displays the estimated time required for reply W1b in the mail information display field W1a on the received mail list screen W1 illustrated in FIG. 5 (S5), and terminates the present processing.

The user interface 23 of the mail client P1 according to the embodiments described above displays the estimated time required for reply according to the message type of the received mail together with the mail information. Therefore, the recipient can judge a mail that requires time for a reply and the mail that does not require time for a reply only by seeing the estimated time required for reply displayed on the PC terminal 2 when newly receiving a mail. Therefore, the recipient can judge preferentially reading a mail that can be immediately replied and can set a schedule of the day when the mail client P1 is activated in consideration of the time required for reply without opening the mail.

Further, the mail discriminated as the mail that does not require a reply is not displayed on the user interface 23 and is also excluded from the object for which the estimated time required for reply is calculated. Therefore, the recipient can reply only to the mail discriminated as the mail that requires a reply.

Next, a configuration example and an operation example of a message transmission and reception system according to one or more embodiments of the present invention will be described.

Figure 7:
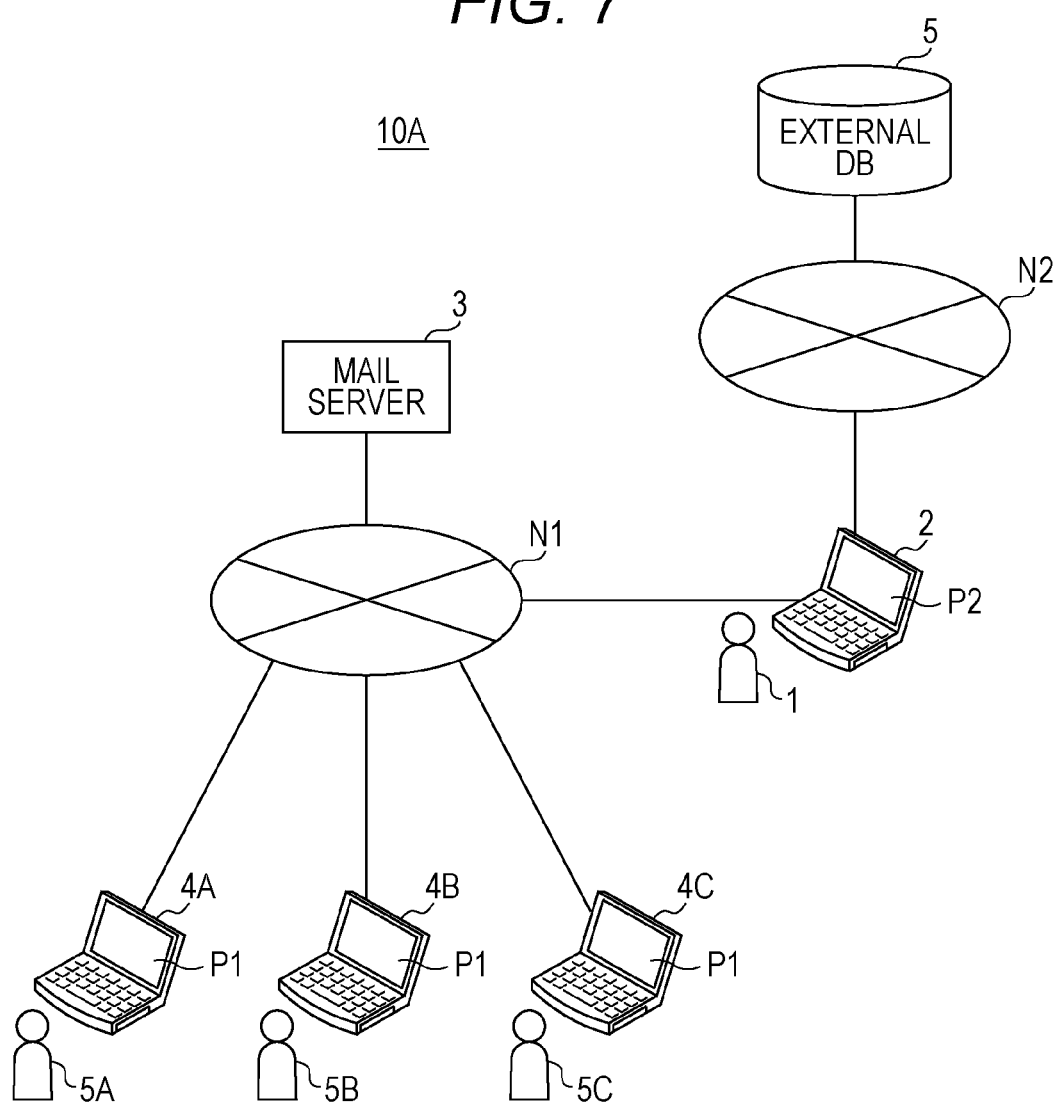
FIG. 7 is an overall configuration diagram illustrating an outline of a message transmission and reception system according to one or more embodiments of the present invention.

FIG. 7 is an overall configuration diagram illustrating an outline of a message transmission and reception system 10A. The message transmission and reception system 10A has a function to estimate an estimated time required for reply on the basis of an actual time to reply by a recipient in the past.

The message transmission and reception system 10A includes an external database 5 in addition to the PC terminal 2, the mail server 3, and the PC terminals 4A to 4C included the message transmission and reception system 10. The external database 5 is connected to an intranet N2, for example, and the PC terminal 2 can access the external database 5. For example, in the case where users 5A to 5C belong to an organization different from a user 1, the PC terminals 4A to 4C used by the users 5A to 5C cannot access the external database 5 through the intranet N2.

The external database 5 stores a history of time required by a recipient (user 1) using the PC terminal 2 to complete a reply to a mail received from a sender using the PC terminals 4A to 4C, as an actual time for reply. Therefore, when receiving a mail, the PC terminal 2 can refer to the external database 5 and calculate a time required for reply on the basis of the history of the past reply time. The external database 5 has history tables T2 and T3 as illustrated in FIGS. 9 and 10 described below.

FIG. 8 is a block diagram illustrating an internal configuration example of the mail client P2.

The mail client P2 is a program operated in the PC terminal 2, and includes an actual time for reply measurer 27, in addition to the communicator 21, the mail manager 22, the user interface 23, the reply necessity discriminator 24, the message type discriminator 25, and the time required for reply calculator 26 included in the mail client P1 according to the aforementioned embodiments. Then, in the mail client P2, the time required for reply calculator 26 acquires the actual time for reply from the external database 5 via the communicator 21.

The actual time for reply measurer 27 measures the actual time for reply required by the recipient who uses the PC terminal 2 from the start of editing a reply mail for replying to the mail to transmission of the reply mail in the past. Then, the actual time for reply measurer 27 starts measurement of the actual time for reply when detecting an operation to start reply to the received mail by the recipient (for example, an operation to press a reply button (not illustrated)) and terminates the measurement of the actual time for reply when the recipient transmits the reply mail. The mail for which the actual time for reply measurer 27 measures the actual time for reply is desirably a mail discriminated as a mail that requires a reply by the reply necessity discriminator 24. Therefore, in the case where the actual time for reply measurer 27 receives mails of the same content from the same sender (for example, reminder mails) in succession, the actual time for reply measurer 27 does not measure the actual time for reply for the mails.

The actual time for reply measurer 27 has a function to measure the actual time for reply when the mail client P2 is in an active state. For example, in the case where a plurality of application programs is activated in the PC terminal 2, an active window explicitly indicating the application program used by the recipient is displayed. Therefore, when the mail client P2 is in the active state (for example, the active window is displayed on the forefront), the mail client P2 being in the active state is discriminated. Then, the actual time for reply measurer 27 stops measurement of the actual time for reply when the mail client P2 is in an inactive state. The actual time for reply measured by the actual time for reply measurer 27 is saved in the external database 5 through the communicator 21.

Then, when the communicator 21 has received a new mail, the time required for reply calculator 26 calculates a time required for reply according to a message type discriminated by the message type discriminator 25 on the basis of the actual time for reply acquired from the external database 5. The time required for reply calculator 26 can calculate an average value of the actual times for reply to all the mails received in the past, as the estimated time required for reply. Note that, for example, the time required for reply calculator 26 may take a value obtained by moving averaging actual times for reply to ten recently received mails, as the actual time for reply.

Figure 11:
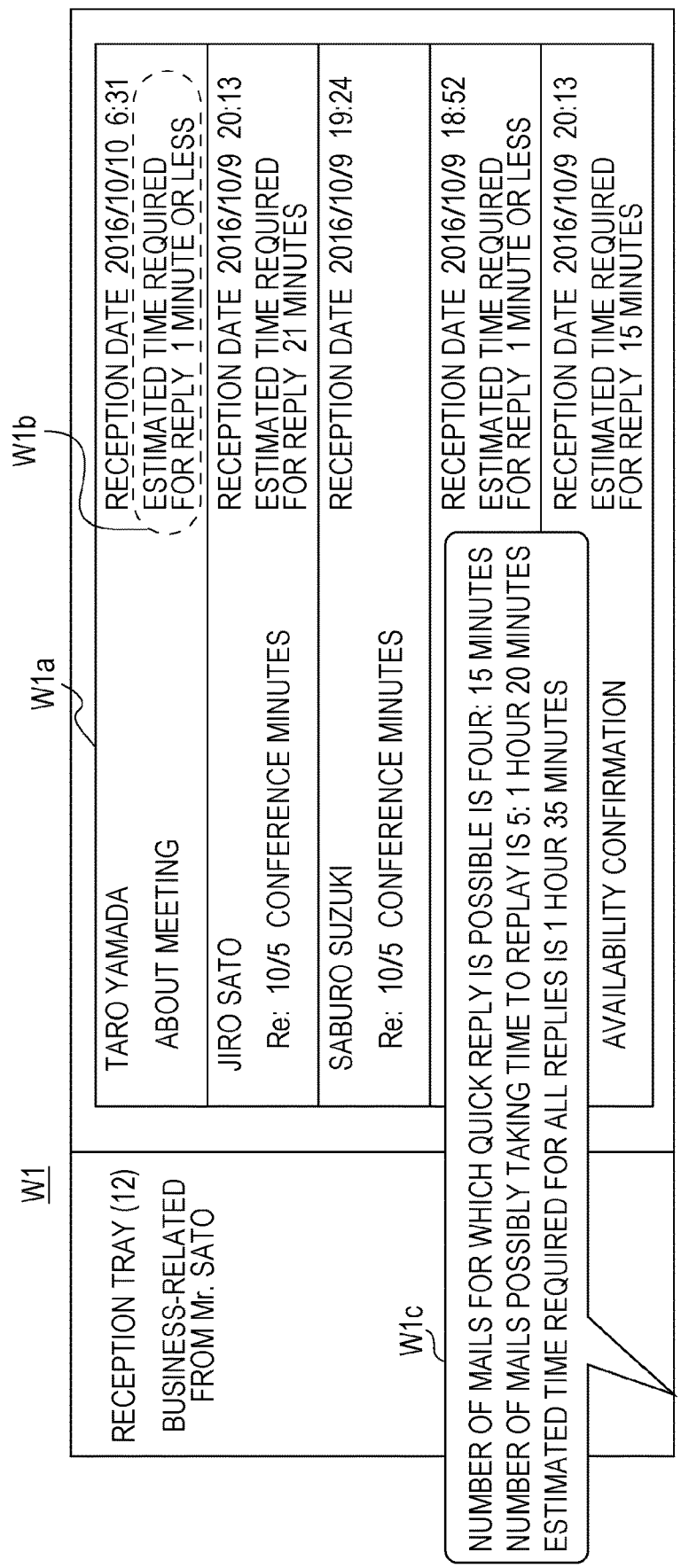
FIG. 11 is an explanatory diagram illustrating a display example of a received mail list screen according to one or more embodiments of the present invention.

Then, the user interface 23 displays the estimated time required for reply calculated by the time required for reply calculator 26 as illustrated in FIG. 11 described below.

FIG. 9 is an explanatory diagram illustrating a configuration example of the history table T2 of YesNo question type.

The history table T2 included in the external database 5 has fields of transmission date and time and the actual time for reply. In the transmission date and time field, the date and time when the recipient has selected either Yes or No and transmitted a reply to the mail to which the YesNo question type is added is stored. Then, in the actual time for reply field, the time required by the recipient to perform a reply action to the mail to which the YesNo question type is added is stored. For example, when the mail client P2 of the PC terminal 2 has received three mails to which the YesNo question type is added in the past, and has replied to the mails, the actual time for reply is managed for each mail.

FIG. 10 is an explanatory diagram illustrating a configuration example of the history table T3 of a general message type.

The field configuration of the history table T3 included in the external database 5 is the same as the field configuration of the history table T2. However, in the transmission date and time field, the date and time when the recipient has transmitted the reply mail to the general message-type mail is stored. In the actual time for reply field, the time required by the recipient to perform the reply action on the general message-type mail is stored. In the reply to the general message-type mail, the recipient needs to write a sentence or the like. Therefore, the actual time for reply to the general message-type mail is longer than the actual time for reply to the YesNo question-type mail.

The time required for reply calculator 26 of the mail client P2 calculates the estimated time required for reply on the basis of the actual time for reply of each message type recorded in the history tables T2 and T3 of the external database 5. At this time, the time required for reply calculator 26 calculates an average of the actual times for reply measured by the actual time for reply measurer 27 for each message type. For example, in the case of the YesNo question-type mail, the actual time for reply is calculated as 55 seconds. Then, the user interface 23 displays the estimated time required for reply calculated by the time required for reply calculator 26

<Display Example of Estimated Time Required for Reply>

Here, a display example of the estimated time required for reply will be described.

FIG. 11 is an explanatory diagram illustrating a display example of a received mail list screen W1. On the received mail list screen W1, an estimated time required for reply display area W1c is displayed superimposed on the received mail list screen W1 by a pop-up window, a dialog box, or the like, in addition to a plurality of mail information display fields W1a. In the estimated time required for reply display area W1c, "the number of mails to which a quick reply is possible and the estimated time required for reply", "the number of mails possibly taking time to reply and the estimated time required for reply", and "the estimated time required for reply to all the mails" are displayed. Then, in an estimated time required for reply W1b, the estimated time required for reply is displayed in minutes (for example, "1 minute or less").

In the estimated time required for reply display area W1c, the time required for reply of a newly received mail is reflected and displayed as the time required for reply calculator 26 calculates the time required for reply of the newly received mail every time the mail client P2 receives a mail. In this manner, the user interface 23 displays the total of the estimated times required for reply estimated by the time required for reply calculator 26, for a plurality of mails, before displaying the mails (message bodies).

Figure 12:
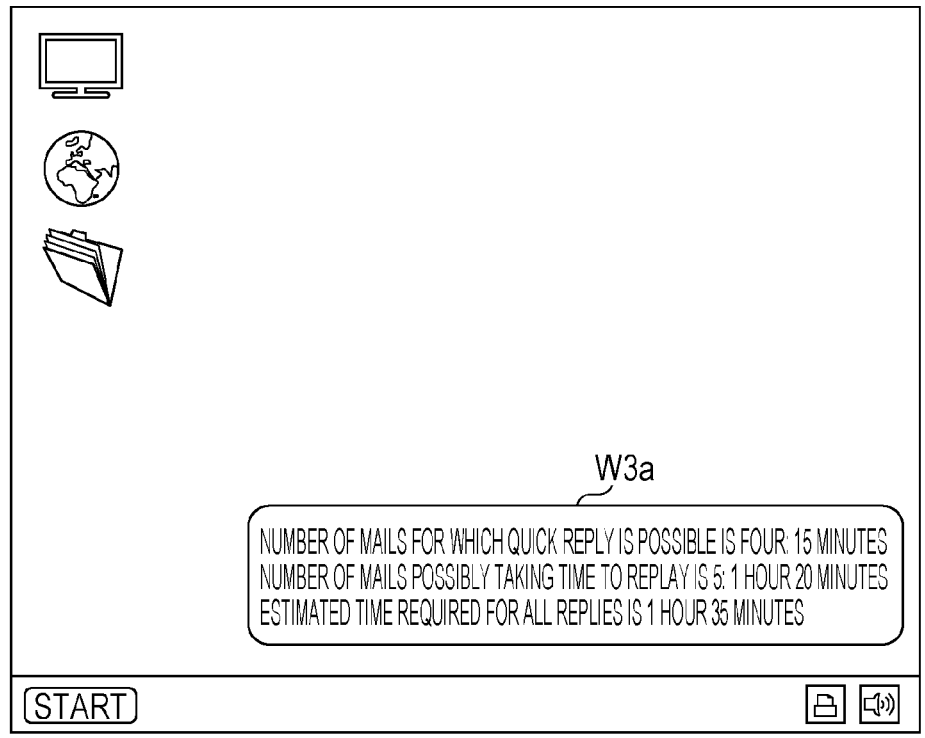
FIG. 12 is an explanatory diagram illustrating an example in which an estimated time required for reply is displayed on a desktop screen of a PC terminal according to one or more embodiments of the present invention.

FIG. 12 is an explanatory diagram illustrating an example in which the estimated time required for reply is displayed on a desktop screen W3 of the PC terminal 2.

On the desktop screen W3, various folder icons are displayed, and an estimated time required for reply display area W3a is displayed on lower right of the screen before a mail (message body) is displayed. The content of the estimated time required for reply display area W3a is similar to the display content of the estimated time required for reply display area W1c. Therefore, the recipient can grasp the number of mails that currently require a reply and the time required for reply even if the recipient does not activate the mail client.

Figure 13:
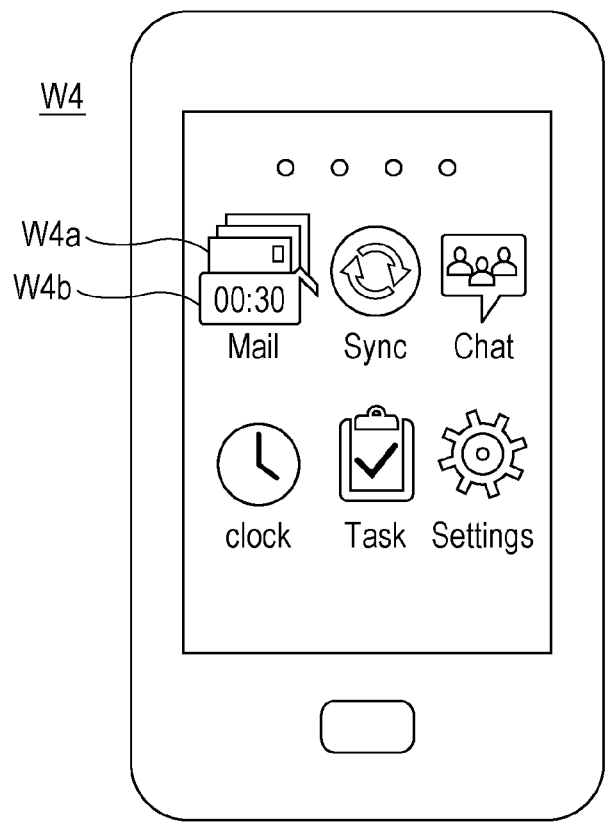
FIG. 13 is an explanatory diagram illustrating an example in which an estimated time required for reply is displayed on a home screen of a tablet terminal according to one or more embodiments of the present invention.

FIG. 13 is an explanatory diagram illustrating an example in which the estimated time required for reply is displayed on a home screen W4 of a tablet terminal. Here, assuming that a tablet terminal is used as the PC terminal 2.

Various function icons are displayed on the home screen W4. Here, a pop icon W4b is displayed superimposed on a function icon W4a displayed as "Mail" on an upper left corner of the home screen W4. The function icon W4a is an icon for instructing creation of a mail by the recipient, and a program for creating a mail is activated when the recipient clicks the function icon W4a. In this manner, the user interface 23 can display the estimated time required for reply to be superimposed on the icon for instructing creation of a mail before displaying a mail (message body).

However, in the tablet terminal, since the area where characters can be displayed in the pop icon W4b is narrow, only the estimated time required for reply (00:30) in the case of replying to all the received mails is displayed on the pop icon W4b, for example. As a result, the recipient can grasp the time required for reply of the mail that currently requires a reply even if the recipient does not select the function icon W4a to activate the mail client.

In the mail client P2 according to the embodiments described above, the number of mails that requires a reply and the time required for reply are displayed together. Therefore, the recipient can easily examine the schedule of his/her work after confirming the time required for reply.

Note that the display examples of the estimated time required for reply illustrated in FIGS. 11 to 13 may be made displayable on the mail client P1. Therefore, the estimated time required for reply is displayed not only on the PC terminal 2 but also on the PC terminals 4A to 4C in a similar form to the PC terminal 2. Further, the estimated time required for reply to an unread mail and the estimated time required for reply to a read mail may be separately displayed. With the display, forgetting a reply to the read mail by the user 1 can be prevented.

Next, a configuration example and an operation example of a message transmission and reception system according to one or more embodiments of the present invention will be described. The message transmission and reception system according to one or more embodiments of the present invention includes an external database that stores a time required for reply, for each transmission destination of a reply mail.

Figures 14, 15:
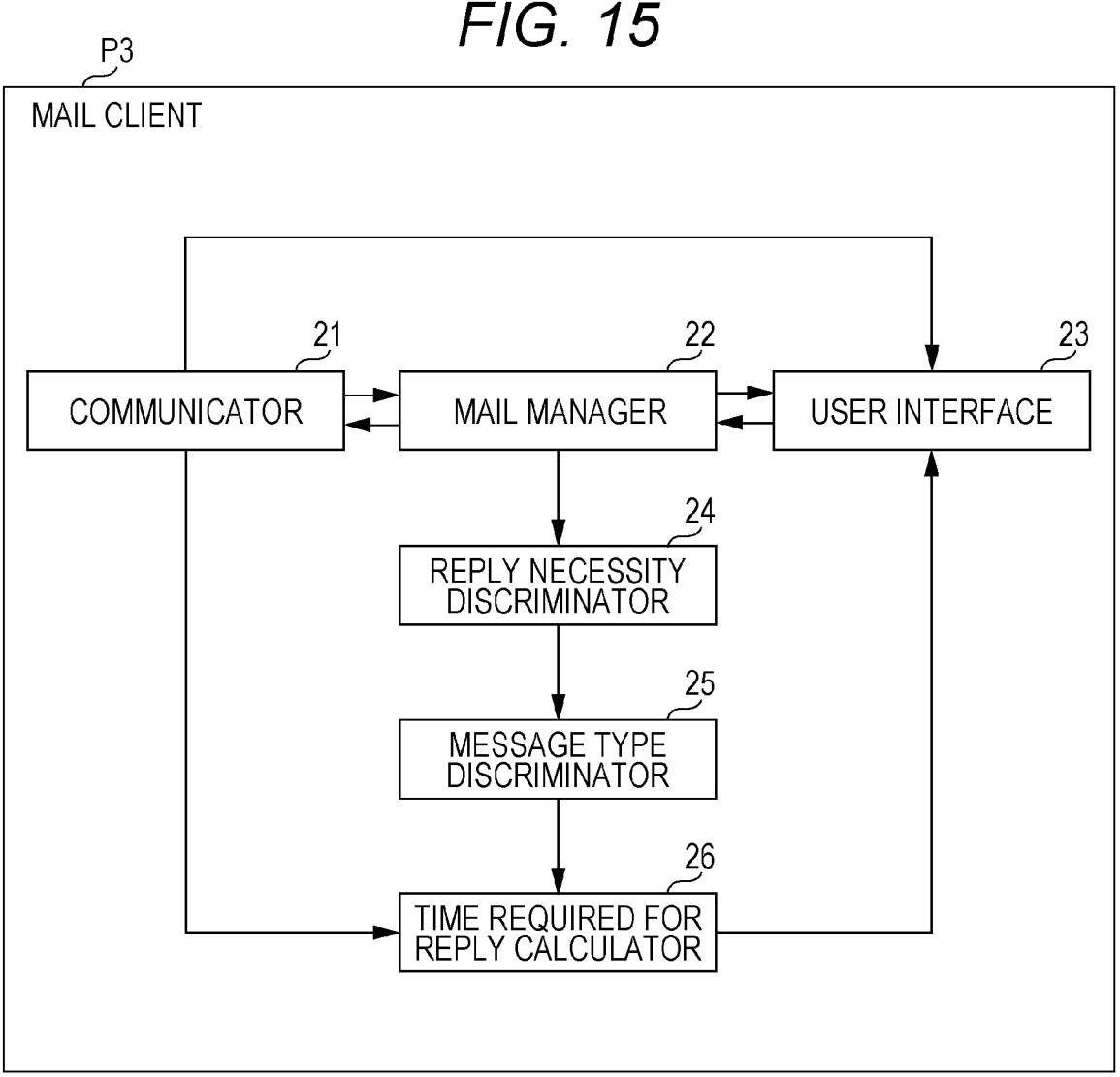
FIG. 14 is an explanatory diagram illustrating a configuration example of a time required for reply storage table by transmission destinations according to one or more embodiments of the present invention.
FIG. 15 is a block diagram illustrating an internal configuration example of a mail client according to one or more embodiments of the present invention.

FIG. 14 is an explanatory diagram illustrating a configuration example of a time required for reply storage table T4 by transmission destinations. The time required for reply storage table T4 is included in an external database 5.

The time required for reply storage table T4 is a table for managing a combination of a message type of a mail and a past time required for reply, for each destination of a reply partner. The time required for reply storage table T4 has fields of a transmission destination, a YesNo question type, and a general message type. Assuming that there are three people: Yamada, Sato, and Suzuki as the transmission destinations of reply mails sent back by a recipient. In this case, the time required for reply storage table T4 stores an average value of times required for reply for each of YesNo question-type mails and general message-type mails discriminated for each transmission destination of the reply mail.

The calculation target of the past time required for reply to be stored in the time required for reply storage table T4 changes depending on whether the transmission destination of the received mail is To (destination), CC, or BCC. For example, in the case where the transmission destination of the received mail is To, it is considered that a reply is requested to the recipient, and thus the mail is included in the calculation target of the past time required for reply. Meanwhile, in the case where the transmission destination of the received mail is CC or BCC, it is considered that no reply is requested to the recipient, and thus the mail is excluded from the calculation target of the past time required for reply. As a result, the past time required for reply is accurately calculated.

Next, a configuration example and an operation example of a mail client used in a message transmission and reception system according to one or more embodiments of the present invention will be described. The mail client according to one or more embodiments of the present invention can visualize a relationship between a recipient and a sender on the basis of information saved in an external database 5.

FIG. 15 is a block diagram illustrating an internal configuration example of a mail client P3. The mail client P3 is a program operated in a PC terminal 2, and has a function to display a human relationship between the recipient and the sender on a user interface 23, in addition to the function of the mail client P2 according to the aforementioned embodiments. Therefore, although the mail client P3 has a similar configuration to that of the mail client P2 according to the aforementioned embodiments illustrated in in FIG. 8, the user interface 23 can display a human relationship display screen W5 (see FIG. 16 described below) received from a communicator 21.

In the external database 5, a relationship between the sender who has transmitted a mail and a past time required for reply when the recipient of the mail has replied to the sender is recorded for each transmission destination of a reply mail. The external database 5 obtains the human relationship of the sender with respect to the recipient on the basis of a time required for reply storage table T4.

Figure 16:
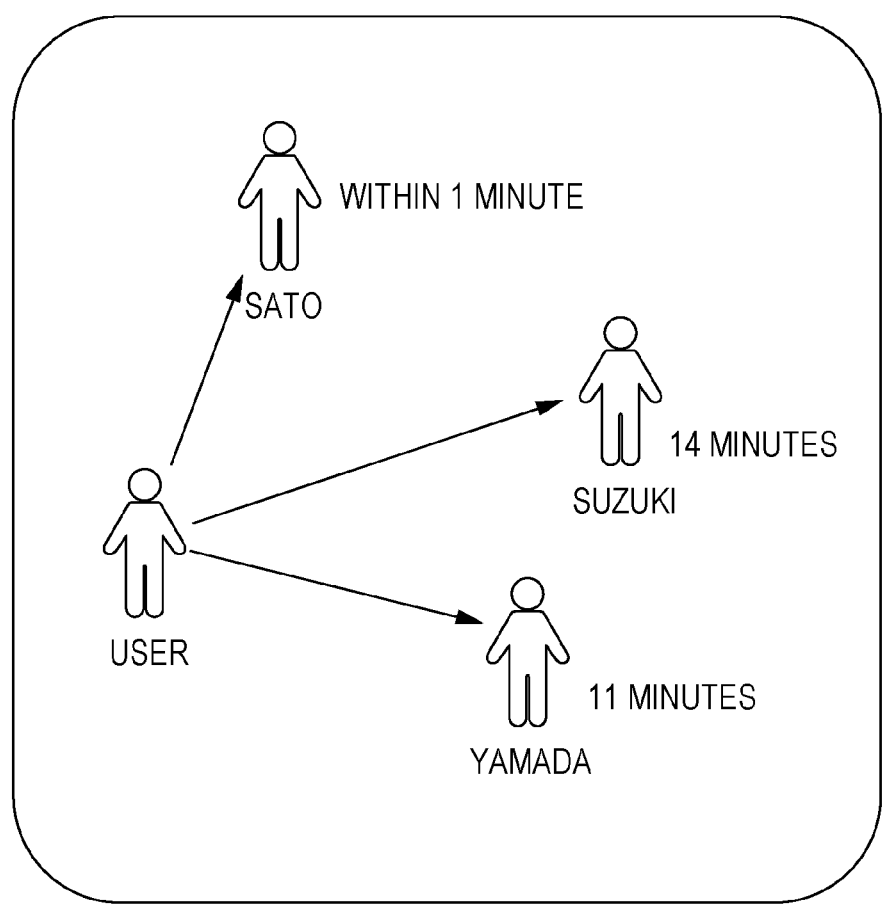
FIG. 16 is an explanatory diagram illustrating a display example of a human relationship display screen according to one or more embodiments of the present invention.

Then, the user interface 23 accesses the external database 5 through the communicator 21, and receives the human relationship of the sender with respect to the recipient. This information includes the human relationship display screen W5 as illustrated in FIG. 16 described below. As a result, the user interface 23 can display the past time required for reply calculated for each transmission destination together with the human relationship of the sender with respect to the recipient.

FIG. 16 is an explanatory diagram illustrating a display example of the human relationship display screen W5. The human relationship display screen W5 is displayed on the user interface 23 of the PC terminal 2, for example.

On the human relationship display screen W5, the estimated time required for reply obtained for each transmission destination of reply mails that are highly likely to be replied by the recipient when the recipient replies to unread mails received by the mail client P3 is visually displayed. For example, FIG. 16 illustrates that the time required for reply is within 1 minute when the recipient replies to the transmission destination of Sato. Similarly, FIG. 16 illustrates that the time required for reply is 14 minutes when the recipient replies to the transmission destination of Suzuki, and the time required for reply is 11 minutes when the recipient replies to the transmission destination of Yamada.

In the mail client P3 according to one or more embodiments of the present invention, the human relationship between the sender who has sent the mail that requests a reply mail and the recipient, and the estimated time required for reply calculated for each sender are visually displayed. In this manner, the human relationship is visually displayed for each transmission destination of the reply mail. Therefore, the recipient can easily judge the transmission destination to which the recipient should preferentially create the reply mail.

Note that the user interface 23 does not need to visualize and display the human relationship. For example, when the user interface 23 displays the human relationship by sentences or a list, the sentences and the list may include the estimated time required for reply. For example, the estimated time required for reply may be included in a pop-up or sentences such as "persons to which a reply is necessary are Sato (the estimated time required for reply is 1 minute or less), Suzuki (the estimated time required for reply is 14 minutes), and Yamada (the estimated time required for reply is 11 minutes)".

Further, the external database 5 may be connected to a network N1 so that the human relationship and the estimated time required for reply may be able to be checked from senders who use PC terminals 4A to 4C.

Next, a configuration example and an operation example of a mail client used in a message transmission and reception system according to one or more embodiments of the present invention will be described. The mail client according to one or more embodiments of the present invention can calculate a time required for reply on the basis of an actual time for reply held by a mail client itself.

Figure 17:
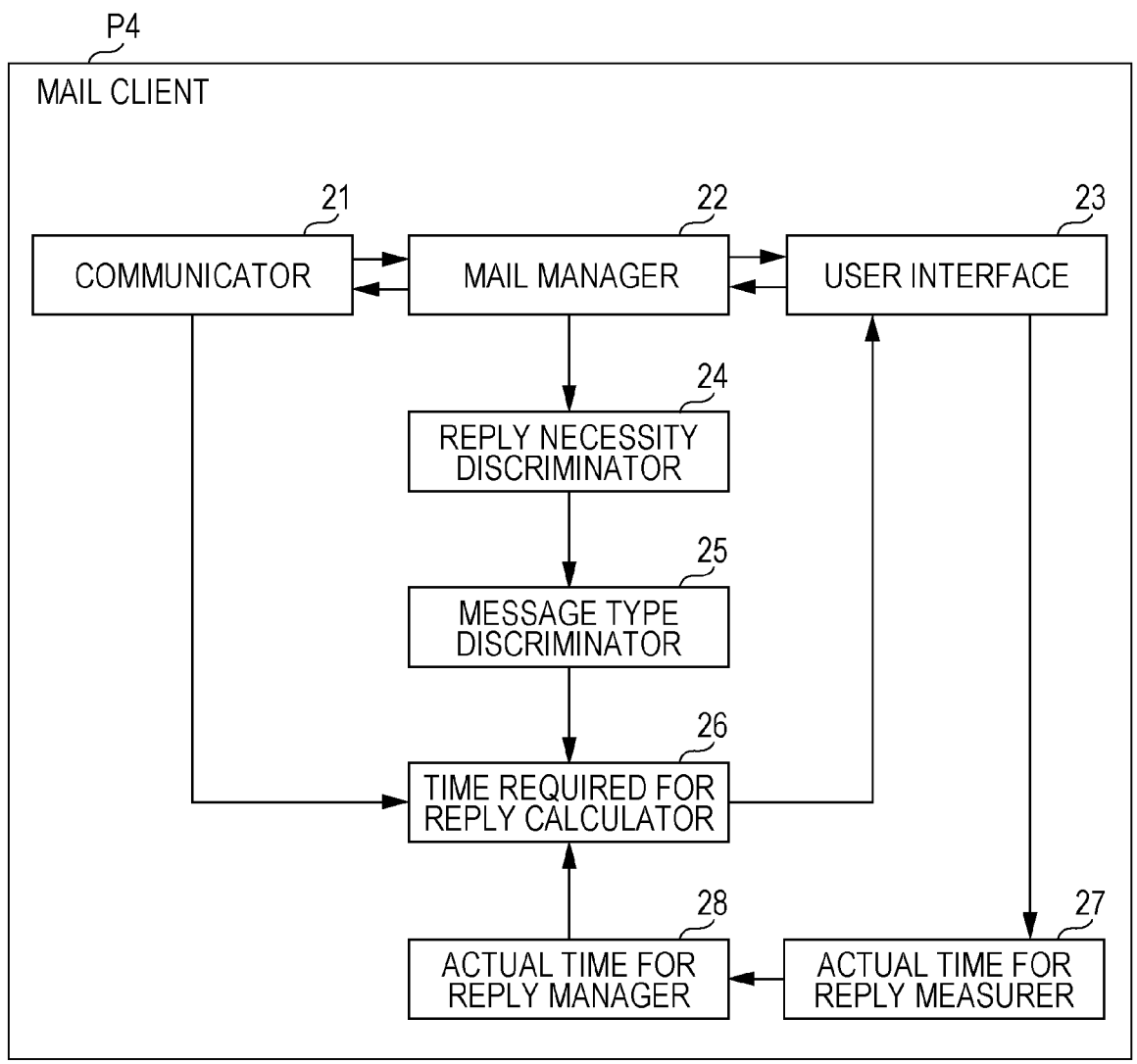
FIG. 17 is a block diagram illustrating an internal configuration example of a mail client according to one or more embodiments of the present invention.

FIG. 17 is a block diagram illustrating an internal configuration example of a mail client P4.

Assuming that the mail client P4 is used in a message transmission and reception system 10 illustrated in FIG. 1 and an external database 5 does not exist. The mail client P4 is a program operated in a PC terminal 2, and has a function to manage the actual time for reply, in addition to the function of the mail client P2 according to the aforementioned embodiments. Therefore, the mail client P4 includes an actual time for reply measurer 28, in addition to a communicator 21, a mail manager 22, a user interface 23, a reply necessity discriminator 24, a message type discriminator 25, a time required for reply calculator 26, and an actual time for reply measurer 27 included in a mail client P1.

The actual time for reply measurer 28 manages the actual time for reply measured by the actual time for reply measurer 27. The actual time for reply measurer 28 constructs history tables T2 and T3 illustrated in FIGS. 9 and 10, for example, in a RAM C3 or a nonvolatile storage C7 illustrated in FIG. 3, and manages the actual time for reply, for each mail or each user of a transmission destination. The time required for reply calculator 26 calculates the time required for reply on the basis of the actual time for reply of each user managed by the actual time for reply measurer 28, and the user interface 23 displays the time required for reply. On the user interface 23, the time required for reply is displayed in a formed as illustrated in FIGS. 11 to 13, for example.

The mail client P4 according to the embodiments described above can manage the actual time for reply even if the mail client P4 is not connected to an external database 5. Therefore, a user who cannot be connected to the external database 5 can confirm the time required for reply on the basis of the past actual time for reply.

Next, an operation example of a mail client used in a message transmission and reception system according to one or more embodiments of the present invention will be described. The mail client according to one or more embodiments of the present invention can discriminate reply necessity and a message type from content of a message body even in the case of a mail to which no message type is added.

FIG. 18 is a block diagram illustrating an internal configuration example of a mail client P5.

The mail client P5 has a similar configuration to the mail client P1 according to the aforementioned embodiments illustrated in FIG. 2, but has a configuration in which the message type discriminator 25 is replaced with a message type discriminator 25A.

Since many mails arrive at a recipient, it is necessary to display an estimated time required for reply only for the mail that requires a reply. Therefore, there is a first method for discriminating the reply necessity according to the message type added to the mail, as a method for discriminating necessity of reply by a reply necessity discriminator 24. For example, since a YesNo question type is a message type that requests an explicit answer of either "Yes" or "No", it is obvious that a reply is necessary. There is also a second method for discriminating the reply necessity according to content of a message. For example, when a phrase such as "please answer" is included in a subject or in a message body included in a mail, the mail can be considered to require a reply.

The reply necessity discriminator 24 refers to a message type discrimination table T5 below including phases of questions in order to discriminate the reply necessity according to the content of the message.

FIG. 19 is an explanatory diagram illustrating a configuration example of a message type discrimination table T5.

In the message type discrimination table T5 included in the reply necessity discriminator 24, phrases by which a mail can be presumed as a mail that requests a reply are stored. Therefore, when the phrase stored in the message type discrimination table T5 is included in the message body of the received mail, the reply necessity discriminator 24 discriminates that the mail as a mail that requires a reply.

Then, the message type discriminator 25A discriminates the message type of the mail discriminated as the mail that requires a reply by the reply necessity discriminator 24. Here, the message type discriminator 25A discriminates the message type on the basis of the content of the message body when the message type is not added to the mail managed by the mail manager 22. For example, when phases of questions that can be answered by Yes or No such as "Is oo correct?" or "Is this correct?" are included in the message body, the message type discriminator 25A discriminates the message type as a YesNo question type.

However, for example, when phases such as "Please let us know about . . . " are included in the message body, the content of the message body can be considered to be a question that cannot be answered by Yes or No. Therefore, the message type discriminator 25A classifies this mail into a general message type. Note that the message type discriminator 25A may classify all the mails that cannot be discriminated as the YesNo question type into the general message type.

Then, the time required for reply calculator 26 calculates the estimated time required for reply for the YesNo question-type message on the basis of the time required table T1 illustrated in FIG. 4.

Figure 20:
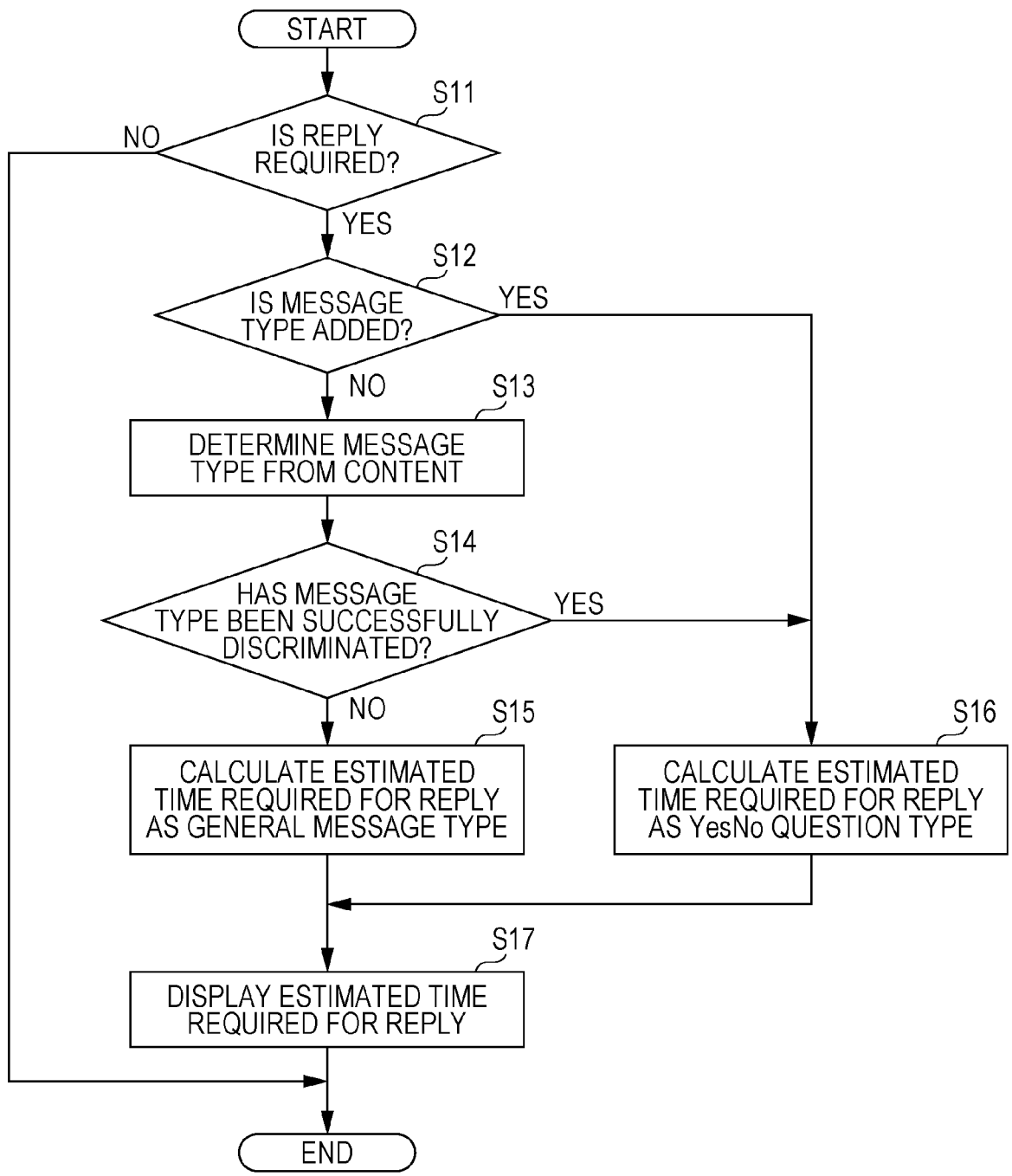
FIG. 20 is a flowchart illustrating an operation example of the mail client according to one or more embodiments of the present invention.

FIG. 20 is a flowchart illustrating an operation example of a mail client P5.

First, after the communicator 21 receives the mail and the mail is saved in the mail manager 22, the reply necessity discriminator 24 discriminates the reply necessity of the mail (S11). The reply necessity of the mail is discriminated by reference to the message type discrimination table T5. The, when the reply necessity discriminator 24 discriminates the mail as a mail that does not require a reply (No in S11), the reply necessity discriminator 24 terminates the present processing.

On the other hand, when the reply necessity discriminator 24 discriminates the main as a mail that requires a reply (Yes in S11), the message type discriminator 25A discriminates whether the message type is added to the mail (S12). When the message type is added to the mail (Yes in S12), the time required for reply calculator 26 calculates the estimated time required for reply in view of the mail as the YesNo question-type mail (S16).

On the other hand, when the message type is not added to the mail (No in S12), the message type discriminator 25A discriminates the message type from the content of the message body (S13). Then, the message type discriminator 25A determines whether the message type has been discriminated (S14).

When the message type can be discriminated as the YesNo question type (Yes in S14), the processing proceeds to step S16. On the other hand, when the message type cannot be discriminated (No in S14), the time required for reply calculator 26 calculates the estimated time required for reply in view of the mail as the general message-type mail (S15).

After step S15 or S16, the time required for reply calculator 26 outputs the calculated estimated time required for reply to the user interface 23. Then, the user interface 23 displays the estimated time required for reply W1b in the mail information display field W1a on the received mail list screen W1 illustrated in FIG. 5 (S17), and terminates the present processing.

The mail client P5 according to one or more embodiments of the present invention discriminates the reply necessity on the basis of the content of the message body even in the case of a mail to which no message type is added. Then, the estimated time required for reply for the discriminated message type can be calculated. Therefore, even when the mail client used by the sender of the mail is manufactured and sold by a manufacturer different from the mail client P5 used by the recipient, the mail client P5 can reliably calculate the estimated time required for reply.

Further, by adding the actual time for reply measurer 27 and the actual time for reply measurer 28 included in the mail client P4 to the mail client P5, the time required for reply calculator 26 may calculate the time required for reply on the basis of the actual time for reply. As a method for calculating the time required for reply by the time required for reply calculator 26, a method of averaging all the actual times for reply of the past mails, a method of moving and averaging the actual times for reply on the basis of replies performed within a predetermined period, or the like may just be used.

[Modification] <Function to Calculate Estimated Time Required for Reply (1)>

In the case where a message type cannot be discriminated by a message type discriminator 25, a time required for reply calculator 26 may calculate an estimated time required for reply on the basis of an amount of received mails or an amount of attached files, in addition to a history of a time required for reply in the past by a recipient. For example, as the amount of mails or the amount of attached files, there is the number of characters of a message body, for example. Then, by dividing the number of characters in the message body by a prescribed value, the estimated time required for reply is calculated. For example, when the message body has 200 characters, the estimated time required for reply can be calculated such as 200 (the number of characters)/50 (the prescribed value)=4 (minute), and when the message body has 1500 characters, the estimated time required for reply can be calculated such as 1500 (the number of characters)/50 (the prescribed value)=30 (minute).

<Function to Calculate Estimated Time Required for Reply (2)>

Further, the time required for reply calculator 26 may calculate the time required for reply, using both the number of characters of the message body and the actual time for reply. For example, it is conceivable to calculate a time required per character from a past reply history, and calculate the time required for reply on the basis of the number of characters in the message body of the received mail.

FIG. 21 is an explanatory diagram illustrating a configuration example of a time required for reply table T6.

The time required for reply table T6 has fields of the actual time for reply, the number of characters, and the time required per character. The time required for reply table T6 is managed by, for example, the time required for reply calculator 26 or an external database 5. When a reply mail is created by a mail client P2, the time required for reply table T6 stores the actual time for reply measured by the actual time for reply measurer 27 and the number of characters of the message body.

When the actual time for reply and the number of characters of the message body are stored in the time required for reply table T6, the time required per character is also calculated by the calculation function incorporated in the time required for reply table T6 and stored in the time required for reply table T6. In the bottom of the time required for reply table T6, an average value of the times required per character calculated by the calculation function of the time required for reply table T6 is stored.

Then, the time required for reply calculator 26 calculates the estimated time required for reply from the number of characters of the message body of a newly received mail on the basis of the average value of the time required per character. For example, assuming that the number of characters in the message body of the newly received mail with the message type of the general message type is 534 characters. In this case, the time required for reply calculator 26 can calculate the estimated time required for reply such as 534 (the number of characters)×0.98 (the average value) =523 (second)=9 (minute).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the above-described embodiments are detailed and specific description of the configurations of the apparatus and the system in order to describe the present invention in an easy-to-understand manner, and the present invention is not necessarily limited to those having all the described configurations. Further, a part of the configuration of the embodiments described here can be replaced with the configuration of another embodiment, and furthermore, the configuration of one or more embodiments can be added to the configuration of another embodiment. Further, another configuration can be added to, deleted from, or substituted for a part of the configuration of each of the embodiments.

Furthermore, control lines and information lines indicate what is considered to be necessary for description, and not all the control lines and information lines are necessarily illustrated on the product. In practice, it can be considered that almost all the configurations are mutually connected.

What is claimed is:

1. An information processing apparatus comprising:
a central processing unit (CPU) that:
 transmits and receives a message via a network;
 manages the message received;
 discriminates reply necessity to the message being managed;
 discriminates a message type according to a content of the message discriminated as a message that requires a reply; and
 calculates an estimated time required by a recipient of the message to reply to the message according to the message type discriminated; and
a user interface that displays the estimated time before displaying the message, wherein
the CPU measures an actual time from when editing of a reply message to the message is started to when the reply message is sent in a past, and transmits the actual time to an external database, and
the CPU calculates the estimated time on the basis of the actual time of each message type managed by the external database.

2. The information processing apparatus according to claim 1, wherein
the CPU discriminates the message sent by multicast transmission as the message that requires a reply when the recipient is included in a destination of the message, and discriminates the message as a message that does not require a reply when the recipient is not included in the destination of the message.

3. The information processing apparatus according to claim 2, wherein
the user interface displays only the message discriminated as the message that requires a reply on a list screen of the message.

4. The information processing apparatus according to claim 1, wherein
the CPU discriminates the reply necessity for each message on the basis of a content of a file attached to the message.

5. The information processing apparatus according to claim 1, wherein
the CPU discriminates the message as the message that requires a reply when the message is unread or when a reply has not been made to the message in a past even when the message is already read, and discriminates the message for which a reply has been made in the past as a message that does not require a reply.

6. The information processing apparatus according to claim 1, wherein
the CPU discriminates the message for which a reply has not been made prior to a predetermined period as a message that does not require a reply.

7. The information processing apparatus according to claim 1, wherein
the CPU discriminates the message as a message that does not require a reply when a reply to the message has been made by another user included in a multicast transmission destination of the message.

8. The information processing apparatus according to claim 1, wherein
the CPU discriminates the message type on the basis of the message type added to the message.

9. The information processing apparatus according to claim 8, wherein
the message type is either an answer request type in which the estimated time is short or a general message type other than the answer request type.

10. The information processing apparatus according to claim 9, wherein
the answer request type includes any of giving two choices, attendance confirmation to an event, and an inquiry about a schedule.

11. The information processing apparatus according to claim 9, wherein
the CPU discriminates the message type on the basis of the content of the message when the message is the general message-type message, or when the message type is not added to the message.

12. The information processing apparatus according to claim 9, wherein
the CPU discriminates the message as the general message-type message when information indicating the degree of importance is added to the message.

13. The information processing apparatus according to claim 8, wherein
the CPU calculates the estimated time on the basis of an amount of the message or an amount of a file added to the message when the message type is not able to be discriminated.

14. The information processing apparatus according to claim 1, wherein
in the external database, a relationship between a sender who has transmitted the message to the recipient, and the estimated time required by the recipient to reply to the sender is recorded for each sender, and
the user interface displays the estimated time for each sender together with the relationship between the sender and the recipient.

15. The information processing apparatus according to claim 1, wherein
the CPU calculates an average value of the actual times as the estimated time.

16. The information processing apparatus according to claim 1, wherein
the user interface displays the estimated time on a list screen of the message.

17. The information processing apparatus according to claim 1, wherein
the user interface displays a total of the estimated times calculated by the CPU for a plurality of the messages.

18. The information processing apparatus according to claim 1, wherein
the user interface displays the estimated time so as to be superimposed on an icon for instructing creation of the message.

19. A non-transitory recording medium storing a computer readable program causing a computer to execute:
discriminating reply necessity to a message received by a central processing unit (CPU) that transmits and receives the message via a network;
discriminating a message type according to a content of the message discriminated as a message that requires a reply;
calculating an estimated time required by a recipient of the message to reply according to the discriminated message type;
displaying the estimated time on a user interface before displaying the message;
measuring an actual time from when editing of a reply message to the message is started to when the reply message is sent in a past, and transmitting the actual time to an external database; and
calculating the estimated time on the basis of the actual time of each message type managed by the external database.

20. An information processing apparatus comprising:
a central processing unit (CPU) that:
transmits and receives a message via a network;
manages the message received;
discriminates reply necessity to the message being managed;
discriminates a message type according to a content of the message discriminated as a message that requires a reply; and
calculates an estimated time required by a recipient of the message to reply to the message according to the message type discriminated; and
a user interface that displays the estimated time before displaying the message, wherein
the CPU measures an actual time from when editing of a reply message to the message is started to when the reply message is transmitted in a past, and
the CPU manages the actual time, and calculates the estimated time on the basis of the actual time of each message type managed.

21. A non-transitory recording medium storing a computer readable program causing a computer to execute:
discriminating reply necessity to a message received by a central processing unit (CPU) that transmits and receives the message via a network;
discriminating a message type according to a content of the message discriminated as a message that requires a reply;
calculating an estimated time required by a recipient of the message to reply according to the discriminated message type;

displaying the estimated time on a user interface before displaying the message;

measuring an actual time from when editing of a reply message to the message is started to when the reply message is transmitted in a past; and managing the actual time, and calculating the estimated time on the basis of the actual time of each message type managed.

* * * * *